US006789755B1

(12) United States Patent
Mack et al.

(10) Patent No.: US 6,789,755 B1
(45) Date of Patent: Sep. 14, 2004

(54) LIVESTOCK ENCLOSURE WASHING ASSEMBLY

(76) Inventors: Jerome Mack, 10858 365th Ave., Leola, SD (US) 57456; Kerry Nilson, 14806 Redman Ave., Omaha, NE (US) 68116

( * ) Notice: Subject to any disclaimer, the term of this patent is extended or adjusted under 35 U.S.C. 154(b) by 0 days.

(21) Appl. No.: 10/374,165

(22) Filed: Feb. 25, 2003

(51) Int. Cl.$^7$ .............................................. B05B 15/08
(52) U.S. Cl. ............................... 239/587.5; 239/587.2; 239/587.1
(58) Field of Search ........................... 239/587.5, 587.2, 239/587.1, 73, 754, 71; 222/608, 612

(56) References Cited

U.S. PATENT DOCUMENTS

| | | | |
|---|---|---|---|
| 3,625,425 A | 12/1971 | Robinson | |
| 4,782,551 A | 11/1988 | Ballwebber | |
| 5,312,044 A | 5/1994 | Eaton | |
| 5,462,227 A | 10/1995 | Ping | |
| 5,594,973 A | 1/1997 | Brusseleers et al. | |
| 5,833,147 A | * 11/1998 | Fuhlbrigge | ............... 239/587.5 |
| 5,947,387 A | 9/1999 | Zink et al. | |
| 6,565,668 B1 | * 5/2003 | Sandberg et al. | ............. 134/18 |
| 2001/0038040 A1 | * 11/2001 | Peterson et al. | ............... 239/8 |

* cited by examiner

*Primary Examiner*—Thomas Denion
*Assistant Examiner*—Zelalem Eshete
(74) *Attorney, Agent, or Firm*—Leonarod & Proehl, Prof. L.L.C.

(57) ABSTRACT

A livestock enclosure washing assembly for automatically spraying down a livestock enclosure to remove dirt and waste materials includes a cart movable within an animal enclosure, an adjustable articulated arm that rotates around the cart in a settable range, a pivoting spray nozzle for spraying in and out from the cart as the articulated arm rotates around the cart, and a pressurizing unit for dispensing a pressurized fluid through the spray nozzle to effectively remove dirt, debris and waste material from surfaces contacted by the pressurized fluid spray.

21 Claims, 8 Drawing Sheets

LIVESTOCK ENCLOSURE WASHING ASSEMBLY

BACKGROUND OF THE INVENTION

1. Field of the Invention

The present invention relates to pressurized fluid cleaning machines and more particularly pertains to a new livestock enclosure washing assembly for automatically spraying down a livestock enclosure to remove dirt and waste materials.

2. Description of the Prior Art

The use of pressurized fluid cleaning machines is known in the prior art. U.S. Pat. No. 5,462,227 describes an automatic cleaning device for use on a stock farm having a pivoting sprinkler head. Another type of pressurized fluid cleaning machine is U.S. Pat. No. 4,782,551 disclosing an apparatus for cleaning surfaces using a pivoting or oscillating spray nozzle. U.S. Pat. No. 5,947,387 discloses a rotatable high pressure tool for cleaning hollow objects in which the tool is rotated by the force of a fluid forced out of the tool at high pressure. U.S. Pat. No. 5,594,973 discloses a cable suspended pulley operated air gun for cleaning the interior walls of a silo. U.S. Pat. No. 3,625,425 discloses a device for cleaning the interior of a vat or tank. U.S. Pat. No. 5,312,044 discloses a rotating arm having downwardly directed spray nozzles for cleaning.

While these devices fulfill their respective, particular objectives and requirements, the need remains for a device that can be set up within an animal enclosure and operated automatically to spray down a selectable area to reduce man hours required to maintain sufficiently sanitary conditions within the enclosure.

SUMMARY OF THE INVENTION

The present invention meets the needs presented above by providing a spray nozzle that pivots to spray a desired range of space coupled with a rotating assembly for moving the spray nozzle laterally to spray over a large three dimensional space.

Still yet another object of the present invention is to provide a new livestock enclosure washing assembly that can be set and left substantially unmonitored to reduce the number of man hours required to clean an enclosure for livestock such as pigs.

Yet another object of the present invention is to sufficiently and economically clean an enclosure such that only manual spot cleaning of particularly soiled areas is needed and that time required for the manual spot cleaning will be greatly reduced after use of the invention.

Even still another object of the present invention is to provide a new livestock enclosure washing assembly that substantially removes all dirt, debris, and waste material automatically from a livestock enclosure to maintain sufficiently sanitary conditions to maintain a high level of animal health.

To this end, the present invention generally comprises a cart movable within an animal enclosure, an adjustable articulated arm that rotates around the cart in a settable range, a pivoting spray nozzle for spraying in and out from the cart as the articulated arm rotates around the cart, and a pressurizing unit for dispensing a pressurized fluid through the spray nozzle to effectively remove dirt, debris and waste material from surfaces contacted by the pressurized fluid spray.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
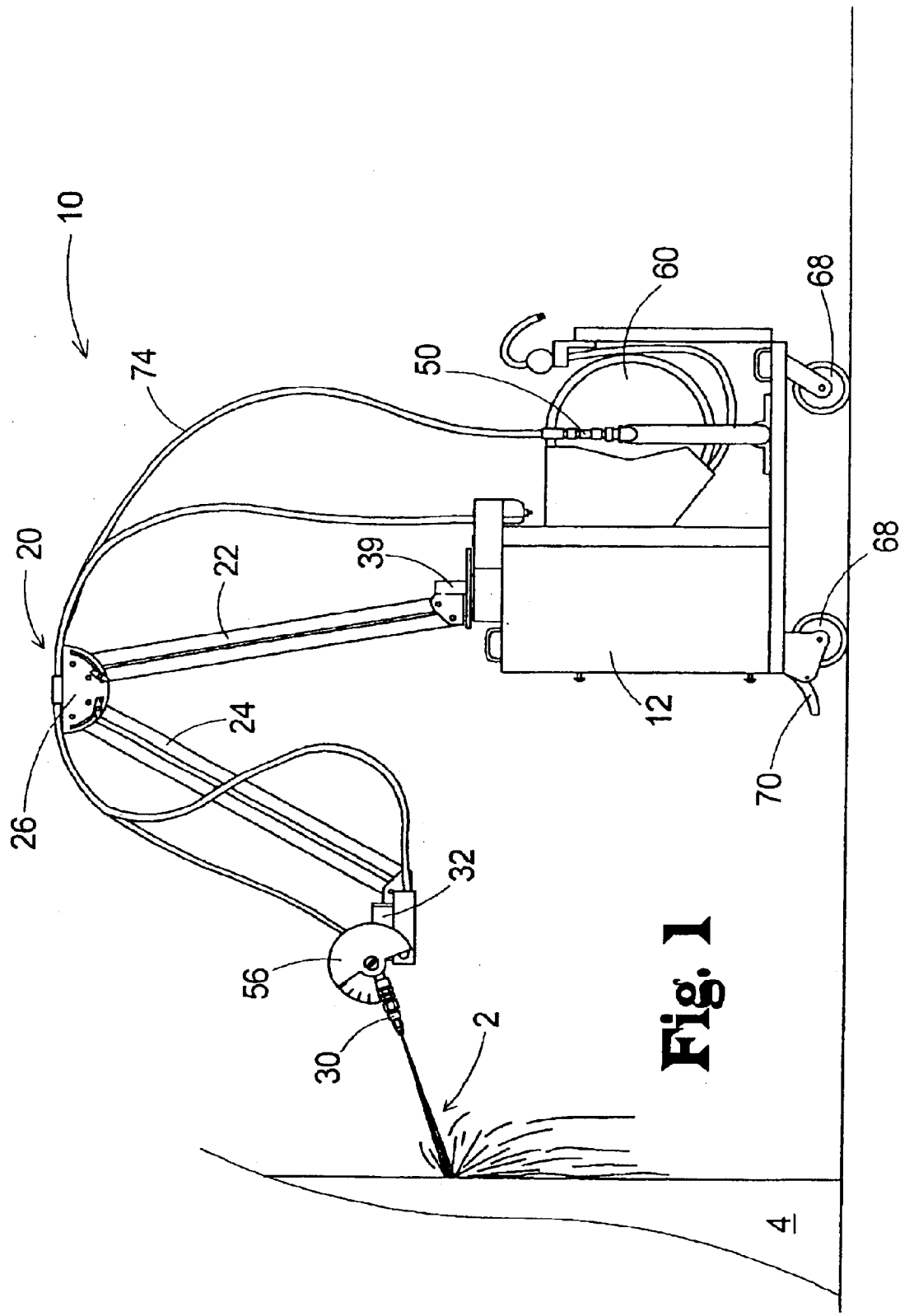
FIG. 1 is a perspective view of a new livestock enclosure washing assembly according to the present invention.
Figure 2:
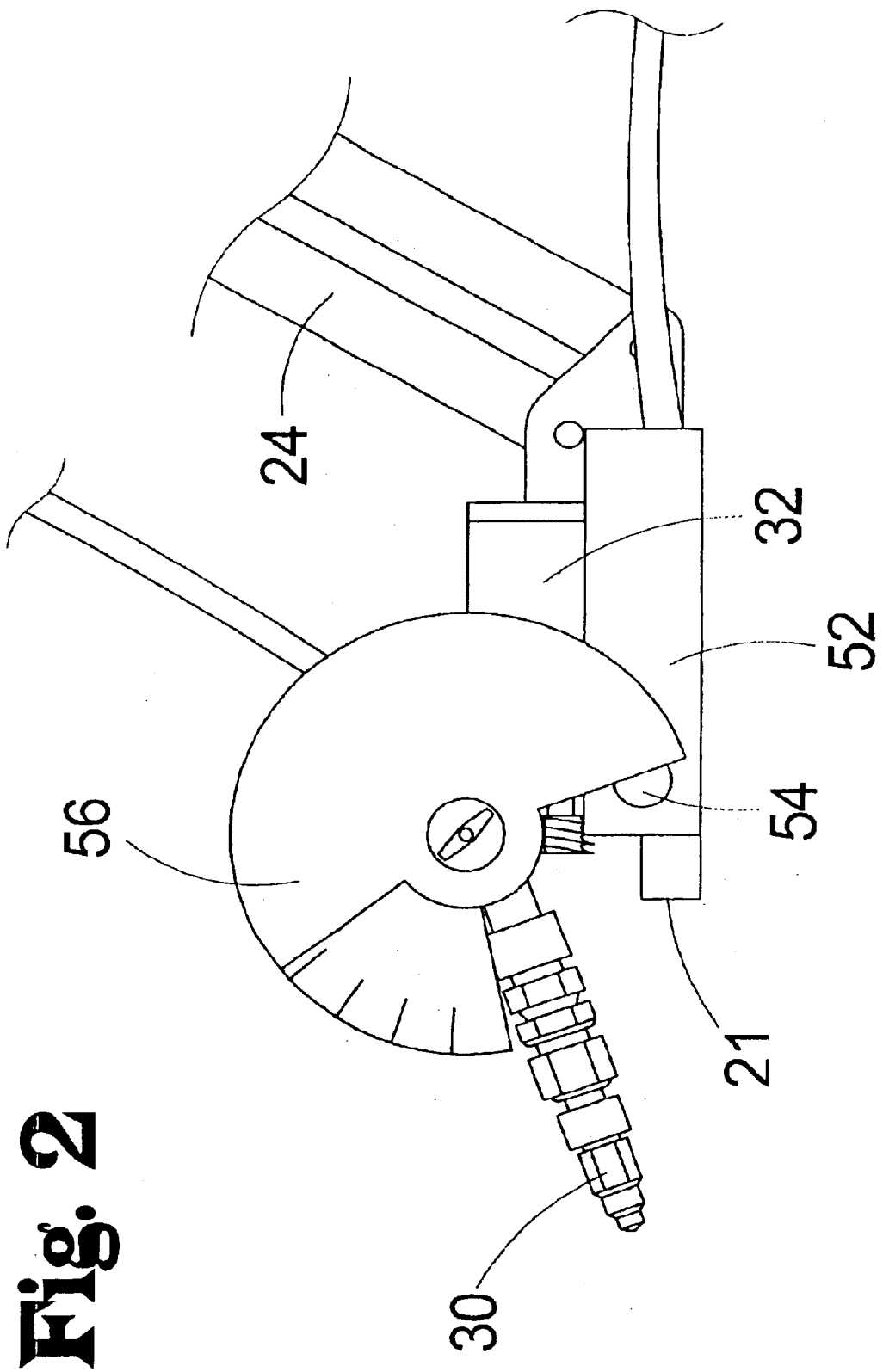
FIG. 2 is an enlarged view of the spray nozzle assembly of the present invention.
Figure 3:
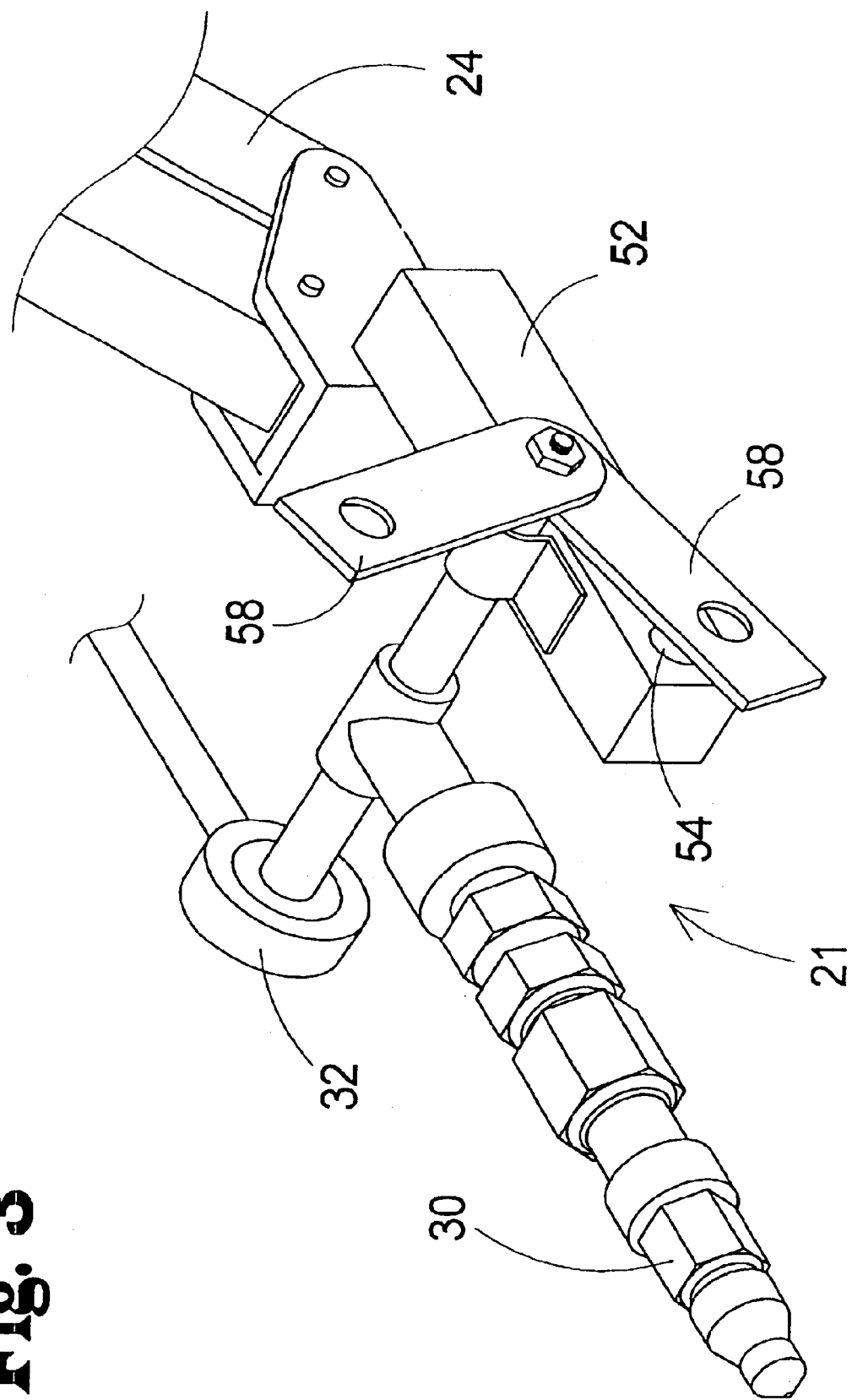
FIG. 3 is an enlarged view of an alternate embodiment of the spray nozzle assembly of the present invention.
Figure 4:
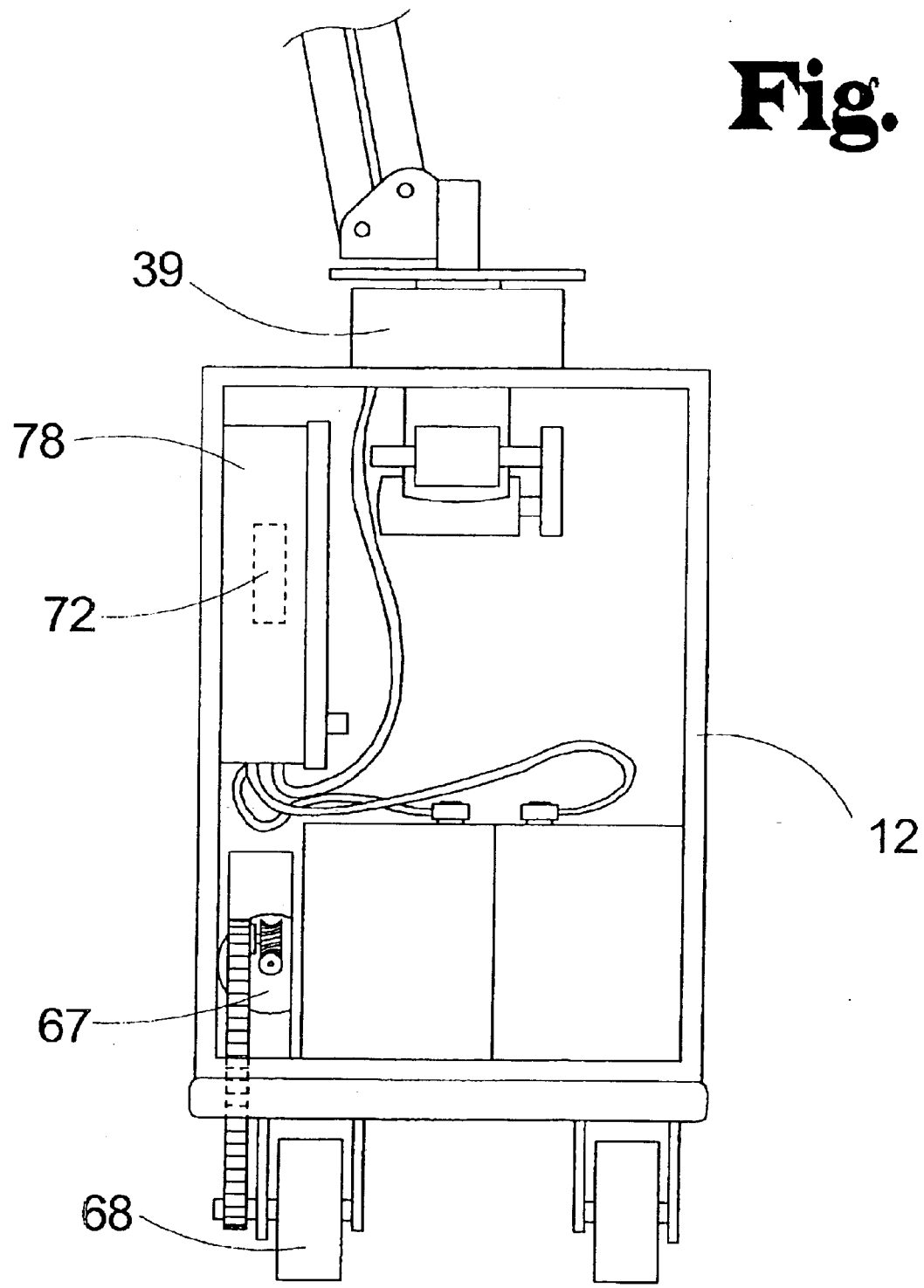
FIG. 4 is an interior view of the cart of the present invention.
Figure 5:
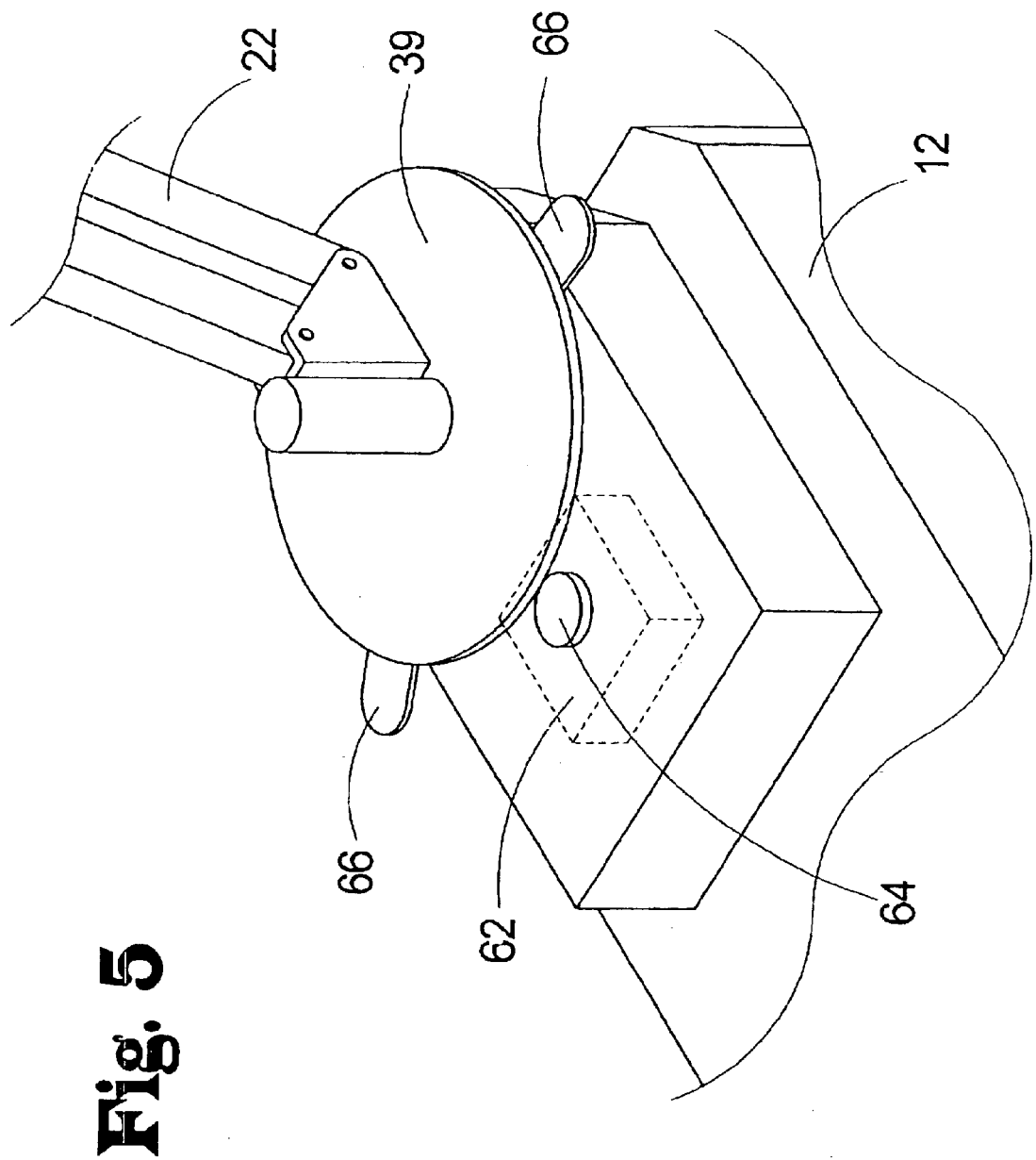
FIG. 5 is a perspective view of the base portion of the articulated arm assembly of the present invention.
Figure 6:
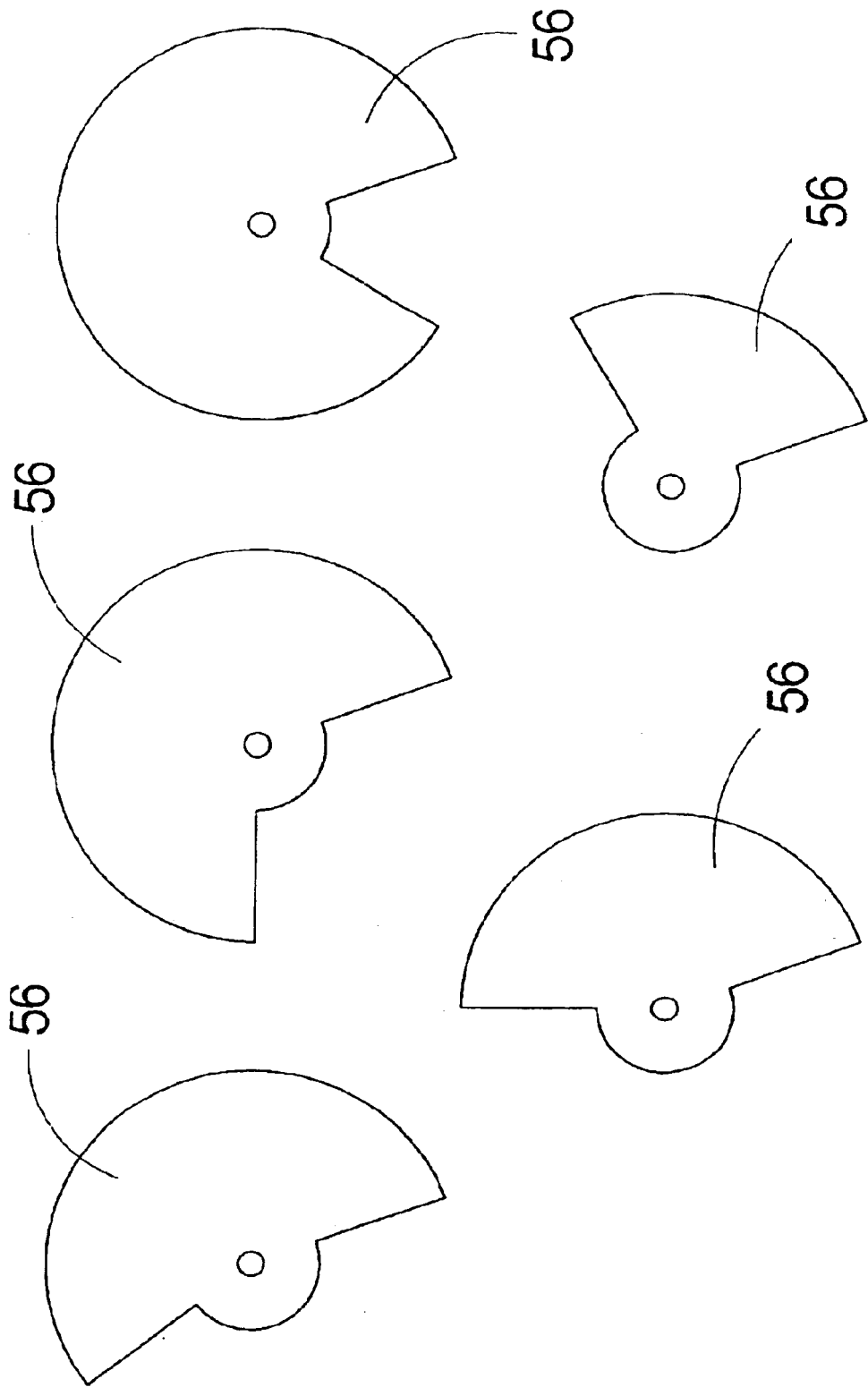
FIG. 6 is a front view of a plurality of spray range disks of the present invention.
Figure 7:
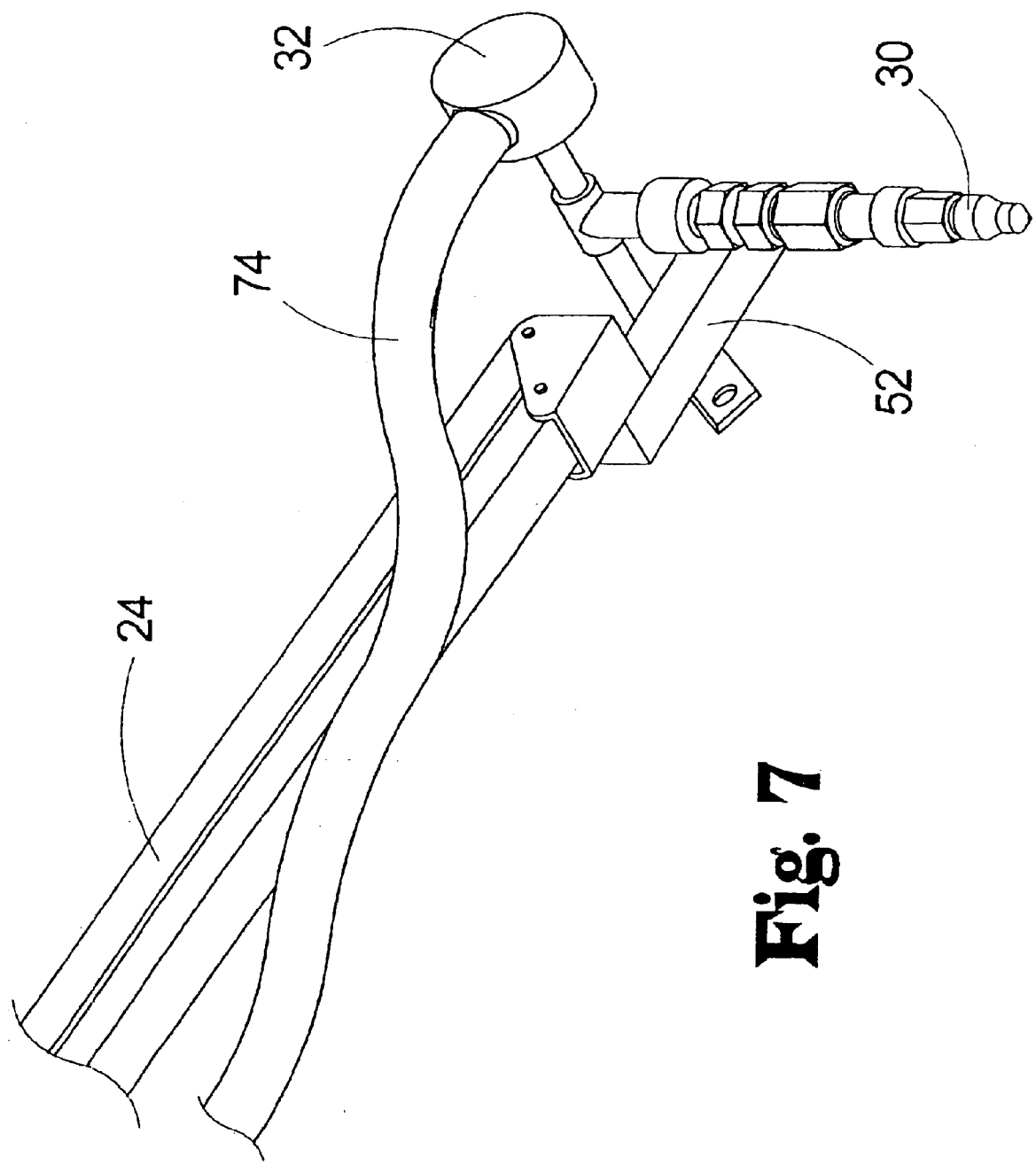
FIG. 7 is a view of the spray assembly of the present invention.
Figure 8:
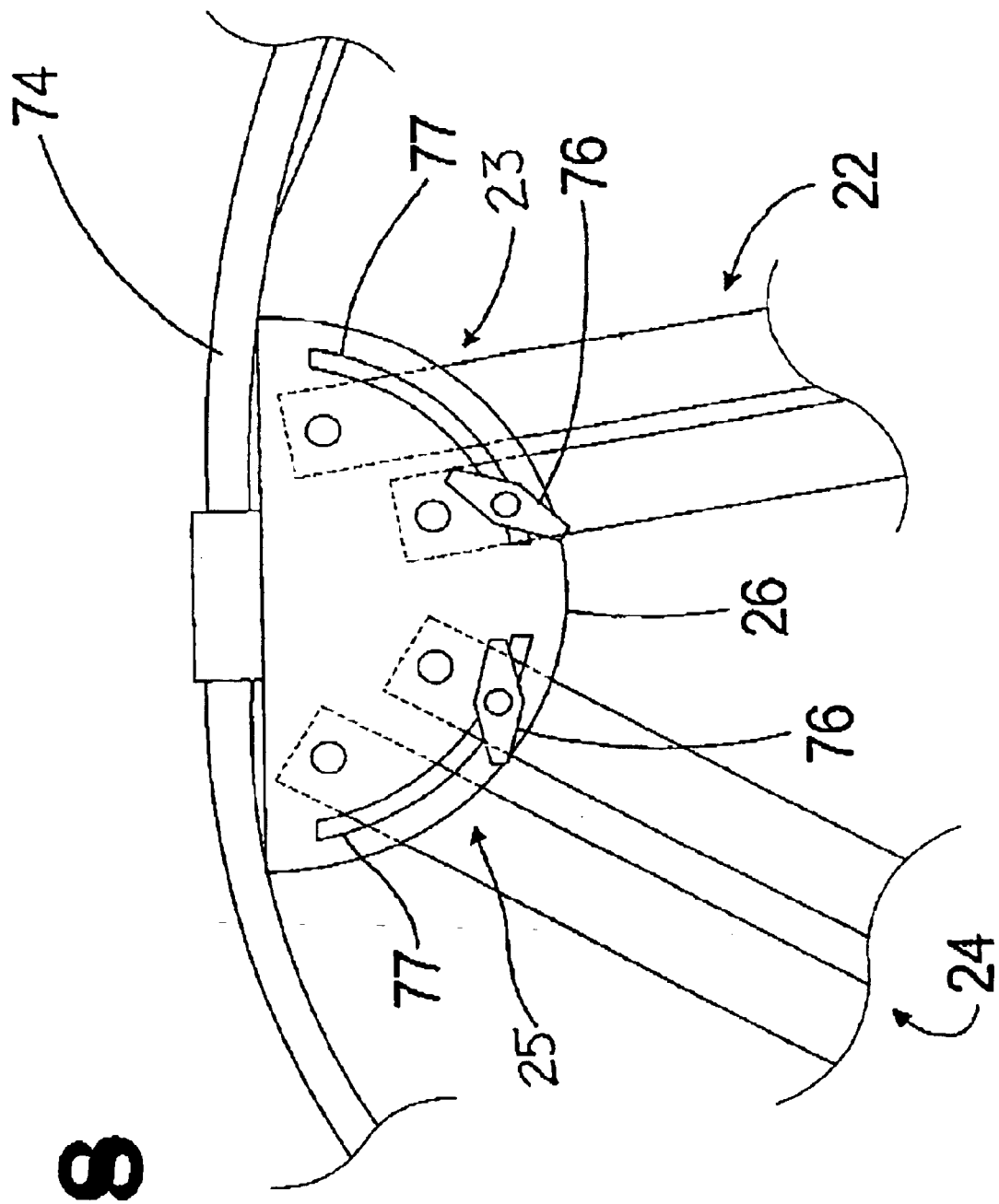
FIG. 8 is an enlarged view of the connection portion of the articulated arm assembly of the present invention.

With reference now to the drawings, and in particular to FIGS. 1 through 8 thereof, a new livestock enclosure washing assembly embodying the principles and concepts of the present invention and generally designated by the reference numeral 10 will be described.

As best illustrated in FIGS. 1 through 8, the livestock enclosure washing assembly 10 generally comprises a cart 12 and an articulated arm assembly 20 coupled to the cart 12. The articulated arm assembly 20 is adjustable for positioning a distal end 21 of the articulated arm assembly 20 at a desired position relative to the cart 12 up to 6 feet of extension from the cart. An articulated arm rotation means 39 is provided for rotating the articulated arm assembly 20 around a substantially vertical axis such that the distal end 21 of the articulated arm assembly 20 moves around the cart 12. A spray nozzle 30 is fed by a hose 74 and coupled to the articulated arm assembly 20 and is pivoted back and forth by a nozzle pivoting means 32. The combination of the rotation and pivoting provides a spray pattern that will effectively douse an area surrounding the cart 12.

A fluid supply 40 is coupled to the spray nozzle 30 for dispensing a fluid 2 through the spray nozzle 30 as the articulated arm assembly 20 and the spray nozzle 30 move.

The articulated arm assembly 20 includes a proximal portion 22, a distal portion 24 and a connection portion 26 positioned between the proximal portion 22 and the distal portion 24. The proximal portion 22 is pivotally coupled to the connection portion 26 and a proximal portion locking means 23 is provided for holding the proximal portion 22 in a static position relative to the connection portion 26. Similarly, the distal portion 24 is pivotally coupled to the connection portion 26 and a distal portion locking means 25 is provided for holding the distal portion 24 in a static position relative to the connection portion 26. The proximal portion 22 is further pivotally coupled to the articulated arm rotation means 30 to permit positioning of the proximal portion 22 of the articulated arm assembly 20 at a desired angle extending away from the articulated arm pivoting means 39. Thus, the articulated arm assembly 20 as a whole is adjustable to position the spray nozzle 30 at a desired position relative to the cart 12. Further, the articulated arm assembly 20 is selectively positionable in a configuration that will permit free rotation of the articulated arm assembly within the available space in the livestock enclosure 4. As shown, the various locking means for the proximal and distal portions of the articulated arm assembly each includes a thumbscrew type connector 76 that couples to a portion of each arm through a slot 77. By tightening the thumbscrew the arm is held in a static position within the slot thus holding the arm in place. Equivalent structures such as locking pins and spaced apertures may also be used.

In an embodiment, a pressurization means 50 is coupled to the cart to pressurize the fluid being dispensed. The pressurization means is positioned between the spray nozzle 30 and the fluid source for pressurizing the fluid being dispensed from the spray nozzle 30. Sufficient results are provided when the spray nozzle 30 dispenses between 3 and 10 gallons of fluid per minute and the fluid is dispensed at a pressure between 1500 and 3000 pounds per square inch. In an embodiment, a hose reel 60 may be included on the cart 12 for carrying a hose for connecting the water pressurization means to the fluid supply.

The spray nozzle 30 is one of a plurality of spray nozzles. Each of the plurality of spray nozzles includes a respective spray pattern to permit selection of a desired spray pattern by the user. Each of the plurality of spray nozzles is interchangeable such that a selectable one of the plurality of spray nozzles is couplable to the articulated arm assembly for permitting use of a desired spray pattern. Alternatively, an adjustable spray nozzle may also be used.

The invention includes an adjustable spray nozzle motion control means 52 for limiting pivoting of the spray nozzle to a selectable range so that the fluid is sprayed in and out relative to the cart over a selectable area. The adjustable spray nozzle motion control means 52 includes a nozzle sensor 54 operationally coupled to the articulated arm assembly 20 proximate the spray nozzle 30 and a spray range disk 56 coupled to the pivoting spray nozzle 30 proximate to the nozzle sensor 54 such that the spray range disk 56 pivots with the spray nozzle 30. The nozzle sensor 54 is operationally coupled to the nozzle pivoting means 32 for reversing direction of the spray nozzle 30 upon the nozzle sensor 54 detecting that a portion of the spray range disk 56 is positioned adjacent to the nozzle sensor 54. Thus, the size of a slice removed from the disk defines the range of motion of the spray nozzle. Alternately, a sensor arrangement may be utilized that reverses direction upon detection that the sensor is aligned with the removed slice and thus the size of the disk will define the range of motion. The spray range disk 56 is typically then one of a plurality of interchangeable spray range disks selectively couplable to the spray nozzle 30 with each spray range disk being shaped to define a respective spray range for the spray nozzle.

An alternative structure for the adjustable spray nozzle motion control means 52 includes a nozzle sensor 54' operationally coupled to the articulated arm assembly 20 proximate the spray nozzle 30 and nozzle tabs 58 coupled to the pivoting spray nozzle 30 proximate to the nozzle sensor 54' such that the nozzle tabs 58 pivot with the spray nozzle 30. The nozzle sensor 54' is operationally coupled to the nozzle pivoting means 32 for reversing direction of the spray nozzle 30 upon the nozzle sensor 54' detecting one of the nozzle tabs 58 positioned adjacent to the nozzle sensor 54'. The nozzle tabs 58 are adjustably positionable to define a range of motion of the spray nozzle. The tabs 58 are coupled in a conventional fashion to permit setting the tabs 58 apart by an adjustable amount with the space-between the tabs 58 defining the range of motion of the spray nozzle 30. It is preferred that the adjustable spray nozzle motion control means 52 has a range of 45 to 360 degrees.

Somewhat similarly, an adjustable arm motion control means 62 is provided for limiting pivoting of the articulated arm assembly 20 to a selectable range.

The adjustable arm motion control means 62 includes an arm rotation sensor 64 coupled to the cart 12 adjacent to a base portion 29 of the articulated arm assembly 20. Because of the difference in accessibility compared to the spray nozzle structure is it preferred to use arm tabs 66 that are coupled to the base portion 29 of the articulated arm assembly 20 proximate to the arm rotation sensor 64 such that the arm tabs 66 pivot with the articulated arm assembly 20. The arm rotation sensor 64 is operationally coupled to the articulated arm rotation means 39 for reversing direction of the articulated arm assembly 20 upon the arm rotation sensor 64 detecting one of the arm tabs 66 is positioned adjacent to the arm rotation sensor 64. The arm tabs 66 are adjustably positionable to define a desired range of motion of the articulated arm assembly 20. The adjustable arm motion control means has a range of 0 to 340 degrees.

Thus, the articulated arm assembly rotates to provide one degree of motion and the spray nozzle pivots back and forth to provide a second degree of motion whereby a complete area surrounding the cart can be sprayed and cleaned automatically by the invention. A timer mechanism 72 may be operationally coupled to the spray nozzle 30 using an actuating means 78 such as a microcontroller system or other form of device for turning the spray nozzle on and off at desired times or after a selectable duration of cleaning.

For ease of positioning, the cart 12 includes a plurality of wheels 68. Wheel locking means 70 are provided for selectively preventing movement of the cart 12. Additionally, cart moving means 67 may be provided for automatically moving the cart during use to increase an area of enclosure cleaned by the fluid. The cart moving means may include a automatic movement of the wheels combined with physical connection of the cart to a track system throughout the enclosure or connection to a winch system to pull the cart in a linear direction at a desired pace to permit ample time for the fluid to clean the enclosure.

In use, the articulated arm assembly is positioned as desired and/or required by the attributes of the enclosure to be cleaned. The invention is connected to a fluid source such as a water line. The desired range of motion for the spray nozzle and the articulated arm is selected to suit the area desired to be cleaned. The invention is then activated and may be shut off either automatically or manually after desired results are achieved.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A livestock enclosure washing system comprising:
   a cart;
   an articulated arm assembly coupled to said cart, said articulated arm being adjustable for positioning a distal end of said articulated arm assembly at a desired position relative to said cart;
   an articulated arm rotation means for rotating said articulated arm assembly around a substantially vertical axis such that said distal end of said articulated arm assembly moves around said cart;
   a spray nozzle coupled to said articulated arm assembly, said spray nozzle being pivotable;
   a nozzle pivoting means for pivoting said spray nozzle;
   a fluid supply coupled to said spray nozzle for dispensing a fluid through said spray nozzle as said articulated arm and said spray nozzle move whereby an enclosure is cleaned by said fluid as said fluid is dispensed;
   said articulated arm assembly having a proximal portion, a distal portion and a connection portion positioned between said proximal portion and said distal portion;
   said proximal portion being pivotally coupled to said connection portion; and
   said distal portion being pivotally coupled to said connection portion.

2. The livestock enclosure washing system of claim 1, further comprising:
   proximal portion locking means for holding said proximal portion in a static position relative to said connection portion;
   distal portion locking means for holding said distal portion in a static position relative to said connection portion.

3. The livestock enclosure washing system of claim 1, further comprising:
   a pressurization means coupled to said cart and between said spray nozzle and said fluid source for pressurizing said fluid being dispensed from said spray nozzle.

4. The livestock enclosure washing system of claim 1, further comprising:
   said spray nozzle being one of a plurality of spray nozzles, each of said plurality of spray nozzles having a respective spray pattern; and
   said plurality of spray nozzles being interchangeable such that a selectable one of said plurality of spray nozzles is couplable to said articulated arm assembly for permitting use of a desired spray pattern.

5. The livestock enclosure washing system of claim 1, further comprising:
   an adjustable spray nozzle motion control means for limiting pivoting of said spray nozzle to a selectable range.

6. A livestock enclosure washing system comprising:
   a cart;
   an articulated arm assembly coupled to said cart, said articulated arm being adjustable for positioning a distal end of said articulated arm assembly at a desired position relative to said cart;
   an articulated arm rotation means for rotating said articulated arm assembly around a substantially vertical axis such that said distal end of said articulated arm assembly moves around said cart;
   a spray nozzle coupled to said articulated arm assembly, said spray nozzle being pivotable;
   a nozzle pivoting means for pivoting said spray nozzle; and
   a fluid supply coupled to said spray nozzle for dispensing a fluid through said spray nozzle as said articulated arm and said spray nozzle move whereby an enclosure is cleaned by said fluid as said fluid is dispensed;
   an adjustable spray nozzle motion control means for limiting pivoting of said spray nozzle to a selectable range, said adjustable spray nozzle motion control means including a nozzle sensor operationally coupled to said articulated arm proximate said spray nozzle and a spray range disk coupled to said pivoting spray nozzle proximate to said nozzle sensor such that said spray range disk pivots with said spray nozzle, said nozzle sensor being operationally coupled to said nozzle pivoting means for reversing direction of said spray nozzle upon said nozzle sensor detecting a portion of said spray range disk being positioned adjacent to said nozzle sensor.

7. A livestock enclosure washing system comprising:
   a cart;
   an articulated arm assembly coupled to said cart, said articulated arm being adjustable for positioning a distal end of said articulated arm assembly at a desired position relative to said cart;
   an articulated arm rotation means for rotating said articulated arm assembly around a substantially vertical axis such that said distal end of said articulated arm assembly moves around said cart;
   a spray nozzle coupled to said articulated arm assembly, said spray nozzle being pivotable;
   a nozzle pivoting means for pivoting said spray nozzle; and
   a fluid supply coupled to said spray nozzle for dispensing a fluid through said spray nozzle as said articulated arm and said spray nozzle move whereby an enclosure is cleaned by said fluid as said fluid is dispensed;
   an adjustable spray nozzle motion control means for limiting pivoting of said spray nozzle to a selectable range, said adjustable spray nozzle motion control means including a nozzle sensor operationally coupled to said articulated arm proximate said spray nozzle and nozzle tabs coupled to said pivoting spray nozzle proximate to said nozzle sensor such that said nozzle tabs pivot with said spray nozzle, said nozzle sensor being operationally coupled to said nozzle pivoting means for reversing direction of said spray nozzle upon said nozzle sensor detecting one of said nozzle tabs being positioned adjacent to said nozzle sensor.

8. The livestock enclosure washing system of claim 7, further comprising:
   said nozzle tabs being adjustably positionable to define a range of motion of said spray nozzle.

9. The livestock enclosure washing system of claim 6, further comprising:

said spray range disk being one of a plurality of interchangeable spray range disks selectively couplable to said spray nozzle, each spray range disk being shaped to define a respective spray range for said spray nozzle.

10. The livestock enclosure washing system of claim 1, further comprising:

an adjustable arm motion control means for limiting pivoting of said articulated arm assembly to a selectable range.

11. A livestock enclosure washing system comprising:

a cart;

an articulated arm assembly coupled to said cart, said articulated arm being adjustable for positioning a distal end of said articulated arm assembly at a desired position relative to said cart;

an articulated arm rotation means for rotating said articulated arm assembly around a substantially vertical axis such that said distal end of said articulated arm assembly moves around said cart;

a spray nozzle coupled to said articulated arm assembly, said spray nozzle being pivotable;

a nozzle pivoting means for pivoting said spray nozzle; and a fluid supply coupled to said spray nozzle for dispensing a fluid through said spray nozzle as said articulated arm and said spray nozzle move whereby an enclosure is cleaned by said fluid as said fluid is dispensed;

an adjustable arm motion control means for limiting pivoting of said articulated arm assembly to a selectable range, wherein said adjustable arm motion control moans comprises:

an arm rotation sensor coupled to said cart adjacent to a base portion of said articulated arm assembly, arm tabs coupled to said base portion of said articulated arm assembly proximate to said arm rotation sensor such that said arm tabs pivot with said articulated arm assembly, said arm rotation sensor being operationally coupled to said articulated arm rotation means for reversing direction of said articulated arm assembly upon said arm rotation sensor detecting one of said arm tabs being positioned adjacent to said arm rotation sensor.

12. The livestock enclosure washing system of claim 11, further comprising:

said arm tabs being adjustably positionable to define a desired range of motion of said articulated arm assembly.

13. The livestock enclosure washing system of claim 1, further comprising:

said cart including a plurality of wheels; and wheel locking means for selectively preventing movement of said cart.

14. The livestock enclosure washing system of claim 5 wherein said adjustable spray nozzle motion control means has a range of 45 to 360 degrees.

15. The livestock enclosure washing system of claim 10 wherein said adjustable arm motion control means has a range of 0 to 340 degrees.

16. The livestock enclosure washing system of claim 1 wherein said spray nozzle dispenses between 3 and 10 gallons of fluid per minute.

17. The livestock enclosure washing system of claim 3 wherein said fluid is dispensed at a pressure between 1500 and 3000 pounds per square inch.

18. The livestock enclosure washing system of claim 2, further comprising:

an actuating means operationally coupled to said spray nozzle for turning said spray nozzle on and off; and a timer mechanism operationally coupled to said actuating means for automatically turning off said spray nozzle after a selectable amount of time.

19. The livestock enclosure washing system of claim 1, further comprising:

cart moving means for moving said cart during use to increase an area of enclosure cleaned by said fluid.

20. The livestock enclosure washing system of claim 2, wherein said proximal portion of said articulated arm is pivotally coupled to said articulated arm rotation means to permit positioning of said articulated arm at a desired angle extending away from said articulated arm pivoting means.

21. The livestock enclosure washing system of claim 1, wherein said proximal portion of said articulated arm assembly comprises a pair of parallel links and said distal portion of said articulated arm assembly comprises a pair of parallel links for maintaining a consistent orientation of said spray nozzle with respect to said cart.

* * * * *